(12) United States Patent
Simpson (10) Patent No.: US 10,473,226 B2
(45) Date of Patent: Nov. 12, 2019

(54) HEAT EXCHANGER VALVES

(71) Applicant: Hamilton Sundstrand Corporation, Charlotte, NC (US)

(72) Inventor: Scott W. Simpson, Easthampton, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 36 days.

(21) Appl. No.: 15/620,409

(22) Filed: Jun. 12, 2017

(65) Prior Publication Data

US 2018/0355990 A1 Dec. 13, 2018

(51) Int. Cl.

| | |
|---|---|
| G05D 23/00 | (2006.01) |
| F16K 31/00 | (2006.01) |
| F28F 13/06 | (2006.01) |
| F28F 3/12 | (2006.01) |
| F28F 7/02 | (2006.01) |
| F28F 27/02 | (2006.01) |
| F28D 7/00 | (2006.01) |
| F28D 9/00 | (2006.01) |
| F28F 1/02 | (2006.01) |
| F16K 31/02 | (2006.01) |

(52) U.S. Cl.
CPC .......... *F16K 31/002* (2013.01); *F16K 31/025* (2013.01); *F28D 7/0025* (2013.01); *F28D 9/0062* (2013.01); *F28F 1/022* (2013.01); *F28F 3/12* (2013.01); *F28F 7/02* (2013.01); *F28F 13/06* (2013.01); *F28F 27/02* (2013.01); *F28F 2215/14* (2013.01); *F28F 2255/04* (2013.01)

(58) Field of Classification Search
CPC .... F16K 31/002; F16K 31/025; F25D 17/047; F25D 17/045; F02B 33/42; F28D 1/05391; F28D 7/0025; F28D 9/0062; F28F 1/022; F28F 3/12; F28F 7/02; F28F 13/06; F28F 27/02; F28F 2215/14; F28F 2255/04
USPC ........................................................ 165/287
See application file for complete search history.

(56) References Cited

U.S. PATENT DOCUMENTS

| | | | |
|---|---|---|---|
| 3,538,717 A | | 11/1970 | Matthies |
| 3,680,329 A | * | 8/1972 | Burtis .................. F25D 17/047 137/215 |
| 4,096,993 A | | 6/1978 | Behr |
| 4,337,737 A | | 7/1982 | Pechner |
| 4,398,868 A | * | 8/1983 | Komauer ................ F02B 33/42 417/64 |
| 5,657,639 A | * | 8/1997 | Lidbeck ................ F25D 17/045 62/186 |
| 7,703,839 B2 | | 4/2010 | McKnight et al. |
| 7,866,737 B2 | | 1/2011 | Browne et al. |
| 8,132,616 B1 | | 3/2012 | Brower et al. |

(Continued)

OTHER PUBLICATIONS

Extended European Search Report for European Patent Application No. 18176833.4, dated Nov. 13, 2018, 5 pages.

*Primary Examiner* — Davis D Hwu
(74) *Attorney, Agent, or Firm* — Kinney & Lange, P.A.

(57) ABSTRACT

A valve for a heat exchanger includes a base configured to be positioned adjacent to an inlet end of a heat exchanger, a heating element positioned on the base, and a flap connected to the base that is movable between an open position and a closed position. The open position permits the flow of fluid into the inlet end of the heat exchanger and the closed position blocks the flow of fluid into the inlet end. The flap is made from a heat responsive material.

27 Claims, 10 Drawing Sheets

(56) References Cited

U.S. PATENT DOCUMENTS

| | | |
|---|---|---|
| 8,434,692 B2 | 5/2013 | Scott et al. |
| 8,651,142 B2 | 2/2014 | Sellers et al. |
| 2004/0206109 A1* | 10/2004 | Nishiwaki ........... F28D 1/05391 62/468 |
| 2009/0200007 A1 | 8/2009 | Foy et al. |
| 2012/0279242 A1 | 11/2012 | Seybold et al. |
| 2014/0360699 A1 | 12/2014 | van Schoor et al. |
| 2015/0153117 A1 | 6/2015 | Rubbelke et al. |
| 2016/0214722 A1 | 7/2016 | McAuliffe et al. |

* cited by examiner

HEAT EXCHANGER VALVES

BACKGROUND

The present disclosure relates to heat exchangers, and in particular, to valves for heat exchangers.

One heat exchanger technology includes plate and fin technology. Plate and fin heat exchangers include layers of corrugated sheets separated by flat metal plates to create a number of finned chambers. A first fluid and a second fluid flow through alternating layers of the heat exchanger. Heat is exchanged between the first fluid and the second fluid at an interface between the fluids as the fluids flow through the heat exchanger. A valve can be positioned in a duct leading to a layer of the heat exchanger to control the flow of fluid through that layer of the heat exchanger.

Positioning a valve in a duct leading to a layer of the heat exchanger adds weight and cost to the ducting leading to the heat exchanger. Further, using a valve in the duct does not allow for control over the flow of air through individual passages through the layer of the heat exchanger. If the valve were to fail, the flow of fluid to the heat exchanger cannot be controlled. This can decrease the performance of the heat exchanger and it can degrade the heat exchanger and downstream systems.

SUMMARY

A valve for a heat exchanger includes a base configured to be positioned adjacent to an inlet end of a heat exchanger, a heating element positioned on the base, and a flap connected to the base that is movable between an open position and a closed position. The open position permits the flow of fluid into the inlet end of the heat exchanger and the closed position blocks the flow of fluid into the inlet end. The flap is made from a heat responsive material.

A heat exchanger includes a first flow path with an inlet and an outlet, a second flow path with an inlet and an outlet, and a valve positioned adjacent to the inlet of the first flow path. The valve includes a base, a heating element positioned on the base, and a flap connected to the base that is movable between an open position and a closed position. The open position permits the flow of fluid into the inlet end of the heat exchanger and the closed position blocks the flow of fluid into the inlet end. The flap is made from a heat responsive material.

A method of controlling the flow of fluid through a heat exchanger includes positioning a valve adjacent to an inlet of a first flow path of a heat exchanger. The valve includes a heat responsive flap that is movable between a first position and a second position. Heat is selectively applied to the heat responsive flap to move the flap from the first position to the second position. The application of heat to the heat responsive flap is discontinued to move the flap from the second position to the first position.

DETAILED DESCRIPTION

Figure 1A:
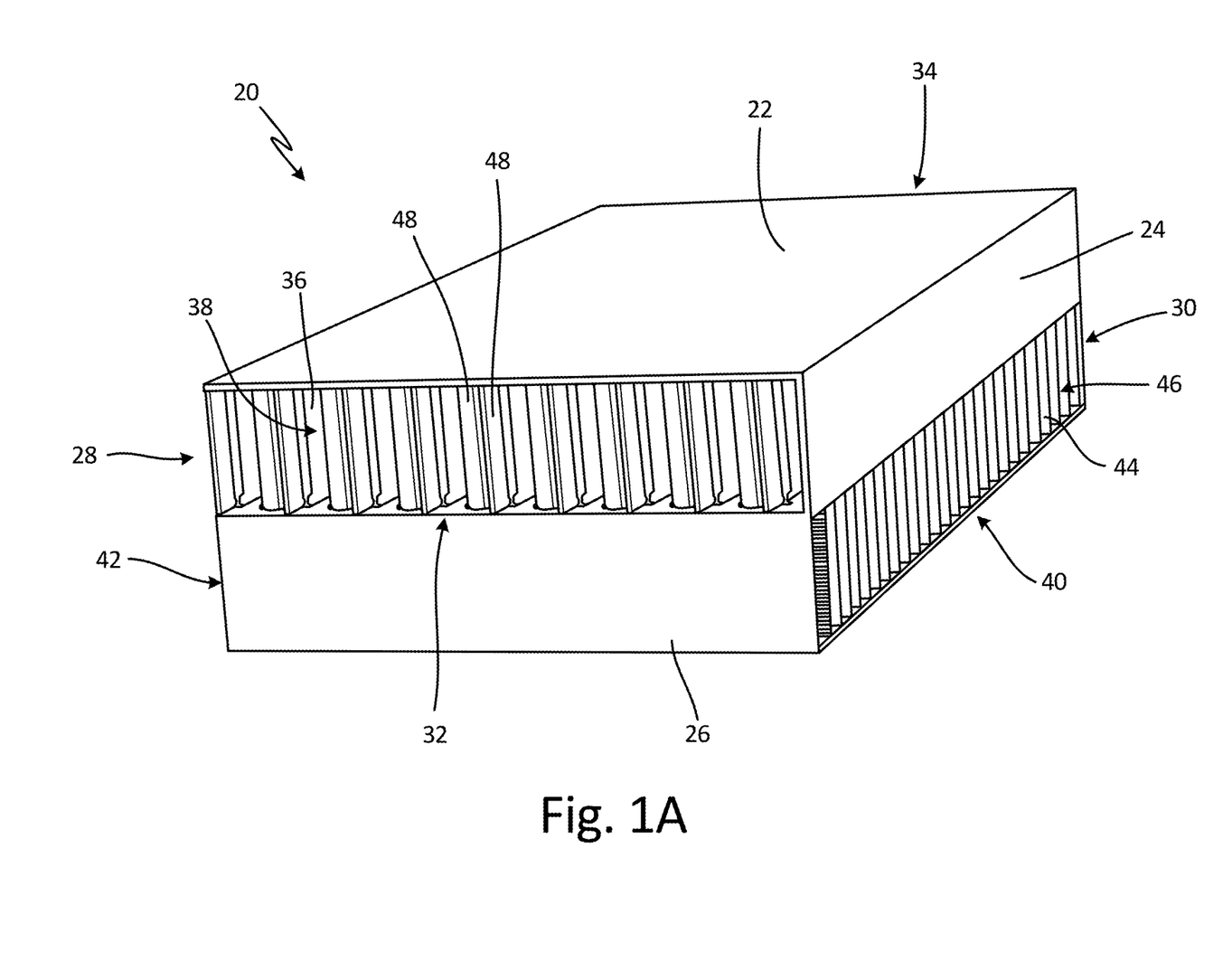
FIG. 1A is a perspective view of a first embodiment of a heat exchanger.
Figure 1B:
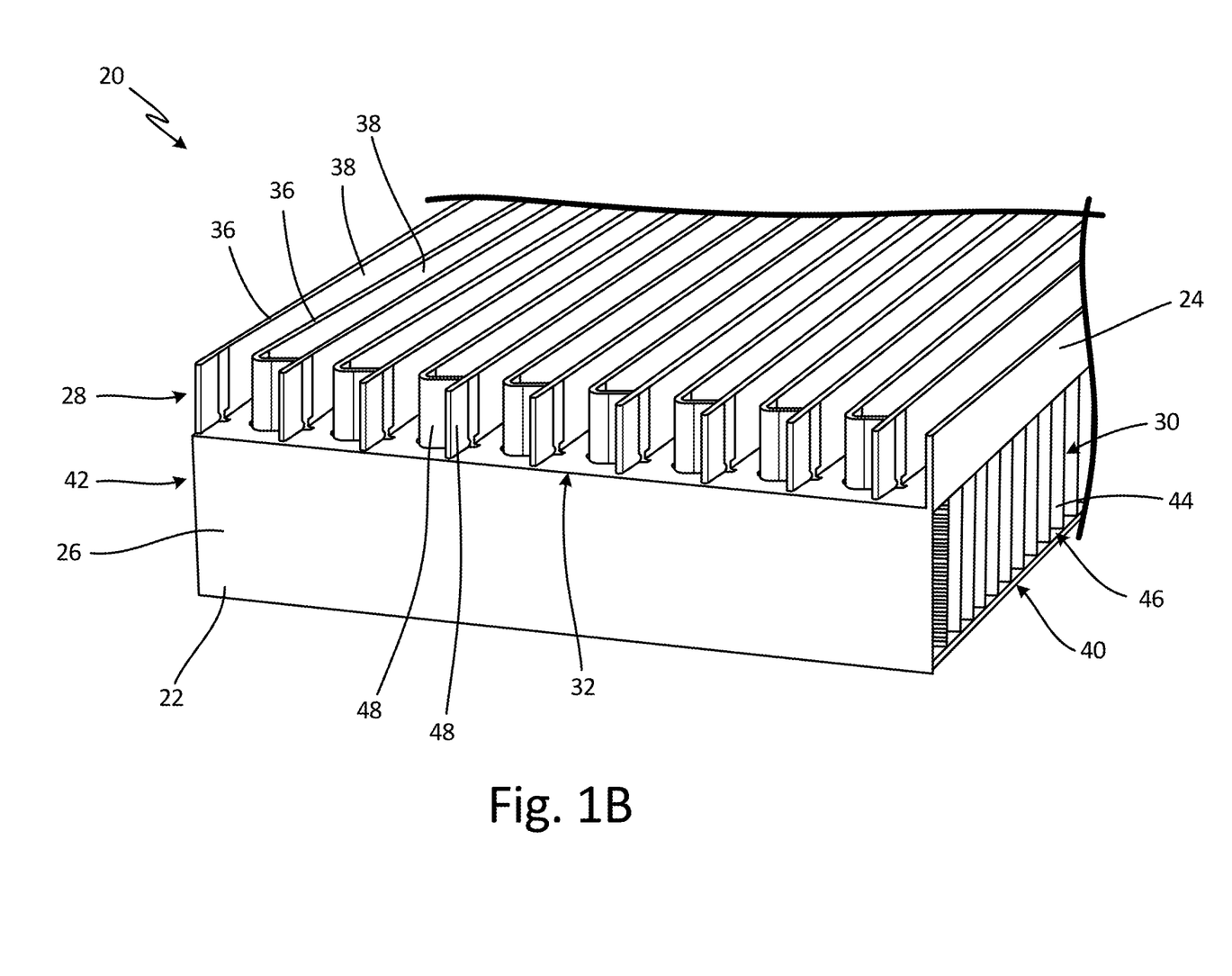
FIG. 1B is a cut-away perspective view of the first embodiment of the heat exchanger shown in FIG. 1A.

FIG. 1A is a perspective view and FIG. 1B is a cut-away perspective view of heat exchanger 20. Heat exchanger 20 includes housing 22, first layer 24, second layer 26, first flow path 28, second flow path 30, inlet 32, outlet 34 (shown in FIG. 1A), fins 36, passages 38, inlet 40, outlet 42, fins 44, passages 46, and valves 48.

Heat exchanger 20 includes housing 22 that forms a body of heat exchanger 20. Heat exchanger 20 includes two layers, including first layer 24 and second layer 26. In alternate embodiments, heat exchanger 20 can include any suitable number of layers. First layer 24 includes first flow path 28 and second layer 26 includes second flow path 30. First flow path 28 extends in a first direction through heat exchanger 20 and second flow path 30 extends in a second direction through heat exchanger 20 that is perpendicular to the first direction. In alternate embodiments, first flow path 28 and second flow path 30 can extend in parallel directions.

First flow path 28 has inlet 32 and outlet 34. Inlet 32 is positioned on a first end of first flow path 28 and outlet 34 is positioned on a second end of first flow path 28. A fluid enters first flow path 28 through inlet 32 and exits first flow path 28 through outlet 34. First flow path 28 further includes fins 36 that are walls that extend from inlet 32 to outlet 34. Fins 36 form passages 38 in first flow path 28. Passages 38 are open channels that extend from inlet 32 to outlet 34 thru which the fluid in first flow path 28 flows.

Second flow path 30 has inlet 40 and outlet 42. Inlet 40 is positioned on a first end of second flow path 30 and outlet 42 is positioned on a second end of second flow path 30. A fluid enters second flow path 30 through inlet 40 and exits second flow path 30 through outlet 42. Second flow path 30 further includes fins 44 that are walls that extend from inlet 40 to outlet 42. Fins 44 form passages 46 in second flow path 30. Passages 46 are open channels that extend from inlet 40 to outlet 42 thru which the fluid in second flow path 30 flows.

A cold fluid can flow through passages 38 of first flow path 28 while a hot fluid flows through passages 46 of second flow path 30. As the hot fluid flows through passages 46 of second flow path 30 it will flow across fins 44 and heat will transfer out of the hot fluid and into fins 44. The heat from fins 44 in second flow path 30 will then transfer through housing 22 of heat exchanger 20 and into fins 36 in first flow path 28. The cold fluid flowing through passages 38 of first flow path 28 can then absorb heat from fins 36. The cold fluid that has absorbed heat from fins 36 can then exit passages 38, removing the heat from heat exchanger 20. In this manner, the hot fluid flowing through second flow path 30 will be cooled as it flows through heat exchanger 20 and the cold fluid flowing through the first flow path 28 will be heated as it flows through heat exchanger 20.

Heat exchanger 20 further includes valves 48 positioned in front of first flow path 28 through heat exchanger 20. One valve 48 is positioned in front of each passage 38. Each valve 48 can be moved between a closed and an open position independent of other valves 48. All of valves 48 can be opened at a time, all of valves 48 can be closed at a time, or select valves 48 can be opened and closed. As seen in FIGS. 1A-1B, every other valve 48 is opened, allowing a cold fluid to flow through every other passage 38 in first flow path 28.

Figure 2A:
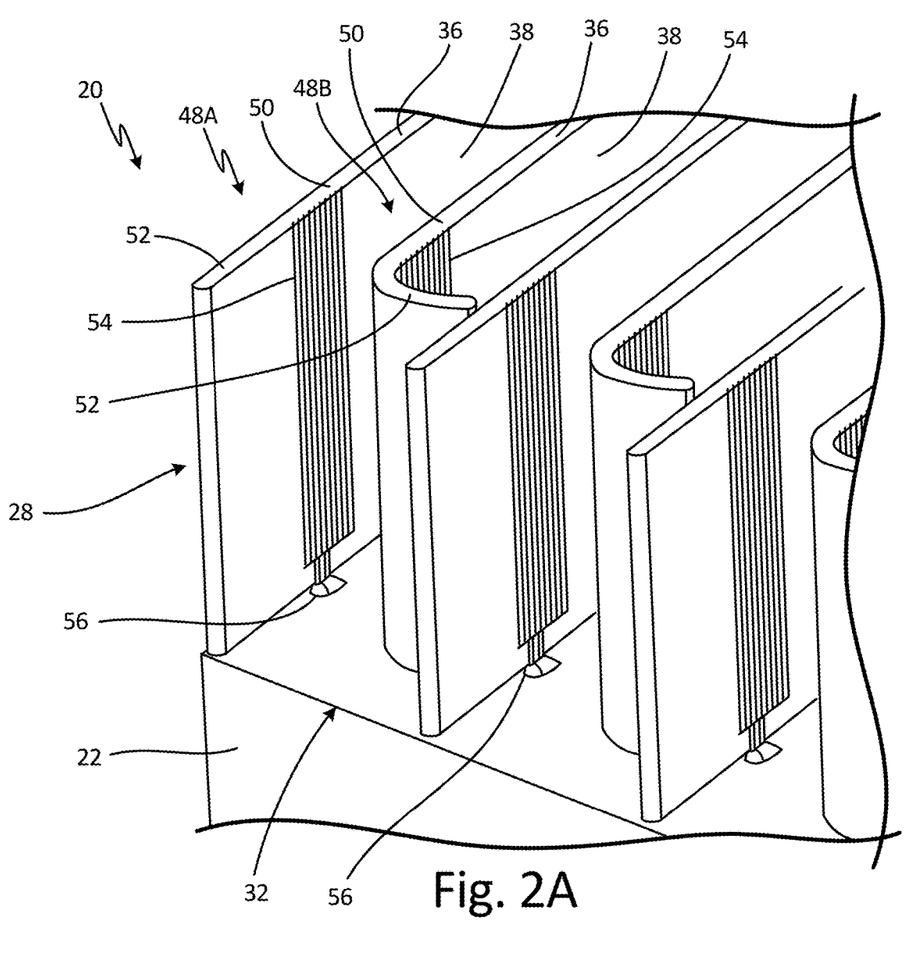
FIG. 2A is a cut-away perspective view of valves in the first embodiment of the heat exchanger.
Figure 2B:
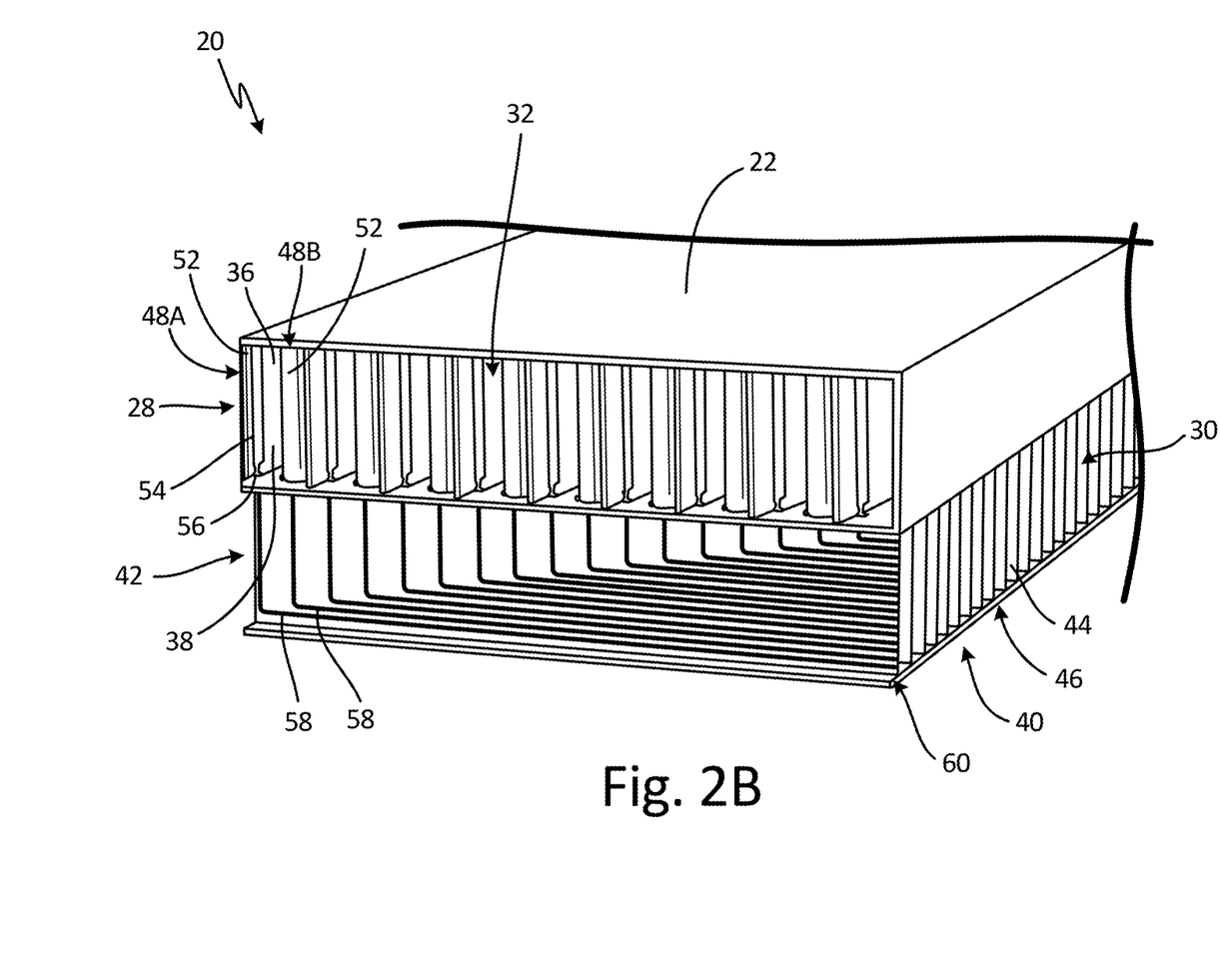
FIG. 2B is a cut-away perspective view of wire traces in the first embodiment of the heat exchanger.

FIG. 2A is a cut-away perspective view of valves 48, and FIG. 2B is a cut-away perspective view of wire traces 58 in heat exchanger 20. Heat exchanger 20 includes housing 22, first flow path 28, second flow path 30 (shown in FIG. 2B), inlet 32, fins 36, passages 38 (shown in FIG. 2A), inlet 40 (shown in FIG. 2B), outlet 42 (shown in FIG. 2B), fins 44 (shown in FIG. 2B), passages 46 (shown in FIG. 2B), valves 48 (including valves 48A and 48B), bases 50, flaps 52, heating elements 54, electrical connectors 56, wire traces 58 (shown in FIG. 2B), and wire passage 60 (shown in FIG. 2B).

Heat exchanger 20 includes housing 22 that forms a body of heat exchanger 20. First flow path 28 extends in a first direction through heat exchanger 20 and second flow path 30 extends in a second direction through heat exchanger 20 that is perpendicular to the first direction.

First flow path 28 has inlet 32 and outlet 34. A fluid enters first flow path 28 through inlet 32 and exits first flow path 28 through outlet 34. First flow path 28 further includes fins 32 that are walls that extend from inlet 32 to outlet 34. Fins 32 form passages 34 in first flow path 28. Passages 34 are open channels that extend from inlet 32 to outlet 34 thru which the fluid in first flow path 28 flows.

Second flow path 30 has inlet 40 and outlet 42. A fluid enters second flow path 30 through inlet 40 and exits second flow path 30 through outlet 42. Second flow path 30 further includes fins 44 that are walls that extend from inlet 40 to outlet 42. Fins 44 form passages 46 in second flow path 30. Passages 46 are open channels that extend from inlet 40 to outlet 42 thru which the fluid in second flow path 30 flows.

Valves 48 are positioned in front of first flow path 28. Valves 48 can be attached to heat exchanger 20 with welding, brazing, or soldering. Alternatively, heat exchanger 20, including valves 48, can be manufactured with an additive manufacturing process so that valves 48 form an integral part of heat exchanger 20. One valve 48 is positioned in front of each passage 38. Valves 48 each include one base 50 and one flap 52. Bases 50 form a structural support for valves 48 and each base 50 is attached to one fin 36. Flaps 52 form a movable portion of valves 48 and each flap 52 is attached to one base 50. Valves 48A and 48B are shown in FIGS. 2A-2B. Valve 48A has flap 52 that is in an open position, allowing cold fluid to flow through passage 38. Valve 48B has flap 52 that is in a closed position, preventing cold fluid from flowing through passage 38.

Flaps 52 are made out of a heat responsive material, such as a bimetallic alloy. Bimetallic alloys will change shape upon exposure to heat. Bimetallic alloys include two different metals that expand at different rates as they are heated. Examples of materials include steel and copper or steel and brass. As the bimetallic alloy is heated, the material with the higher coefficient of thermal expansion will expand faster and cause the bimetallic alloy to curve.

Heating elements 54 are positioned on bases 50 to heat bases 50 and flaps 52. Heating elements 54 can be manufactured or assembled onto flaps 52 using direct write additive manufacturing process or attached to flaps 52 using a high temperature adhesive bond. Electrical connectors 56 are attached to heating elements 54 on a first end and to wire traces 58 on a second end to electrically connect heating elements 54 and wire traces 58. Wire traces 58 are positioned in wire passage 60, as shown in FIG. 2B. Wire passage 60 extends from inlet 40 to outlet 42 and is parallel with passages 46 through second flow path 30. Wire traces 58 will be connected to a controller (not shown in FIGS. 2A-2B) to provide electrical signals to wire traces 58. To heat heating elements 54, electrical signals are sent along wire traces 58 through electrical connectors 56 to heating elements 54. Heating elements 54 heat bases 50 and the heat in bases 50 transfers to flaps 52 to cause flaps 52 to deform.

Prior art valves were positioned in a duct that provided a cold fluid to first flow path 28 and were either opened or closed. This allowed the cold fluid flow to be either on or off. Further, if the valve were to fail, the cold fluid flow could not be controlled. Using one valve 48 positioned in front of each passage 38 allows for greater control over the flow of cold fluid through first flow path 28. Further, the impact of the failure of one valve 48 is greatly reduced and may not have a noticeable impact on the function of heat exchanger 20.

Figure 3A:
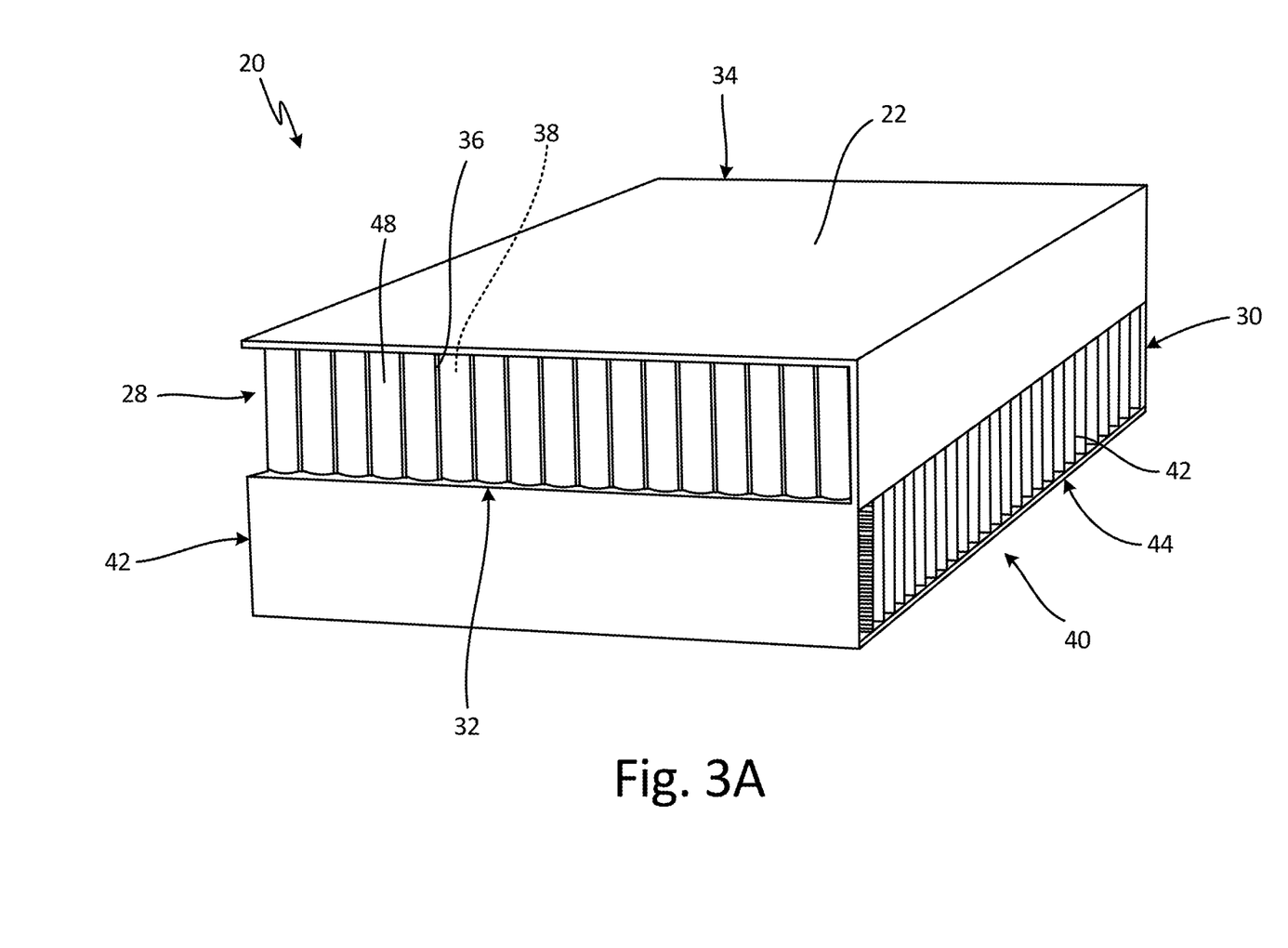
FIG. 3A is a perspective view of the first embodiment of the heat exchanger where the valves are closed.
Figure 3B:
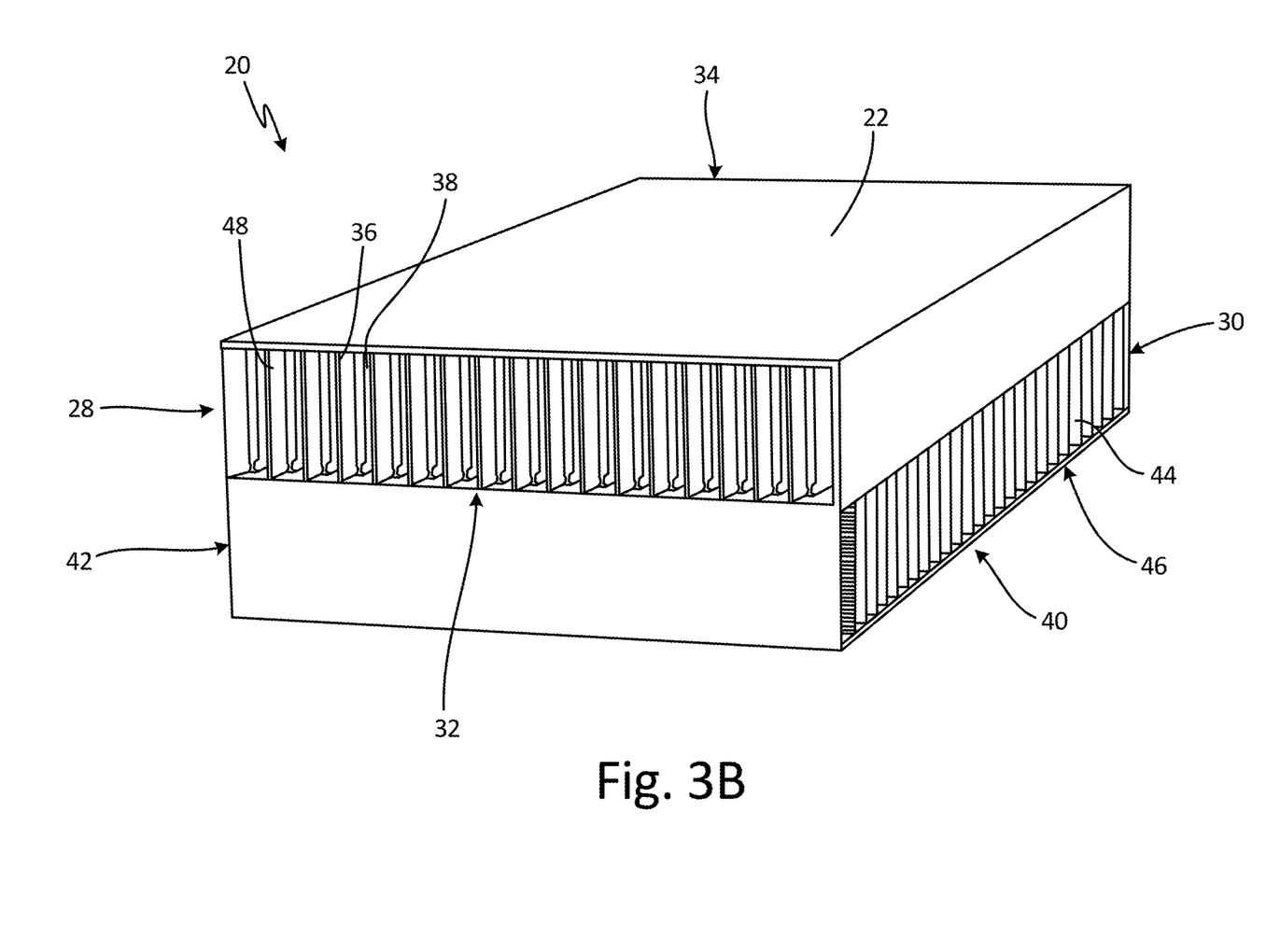
FIG. 3B is a perspective view of the first embodiment of the heat exchanger where the valves are open.
Figure 3C:
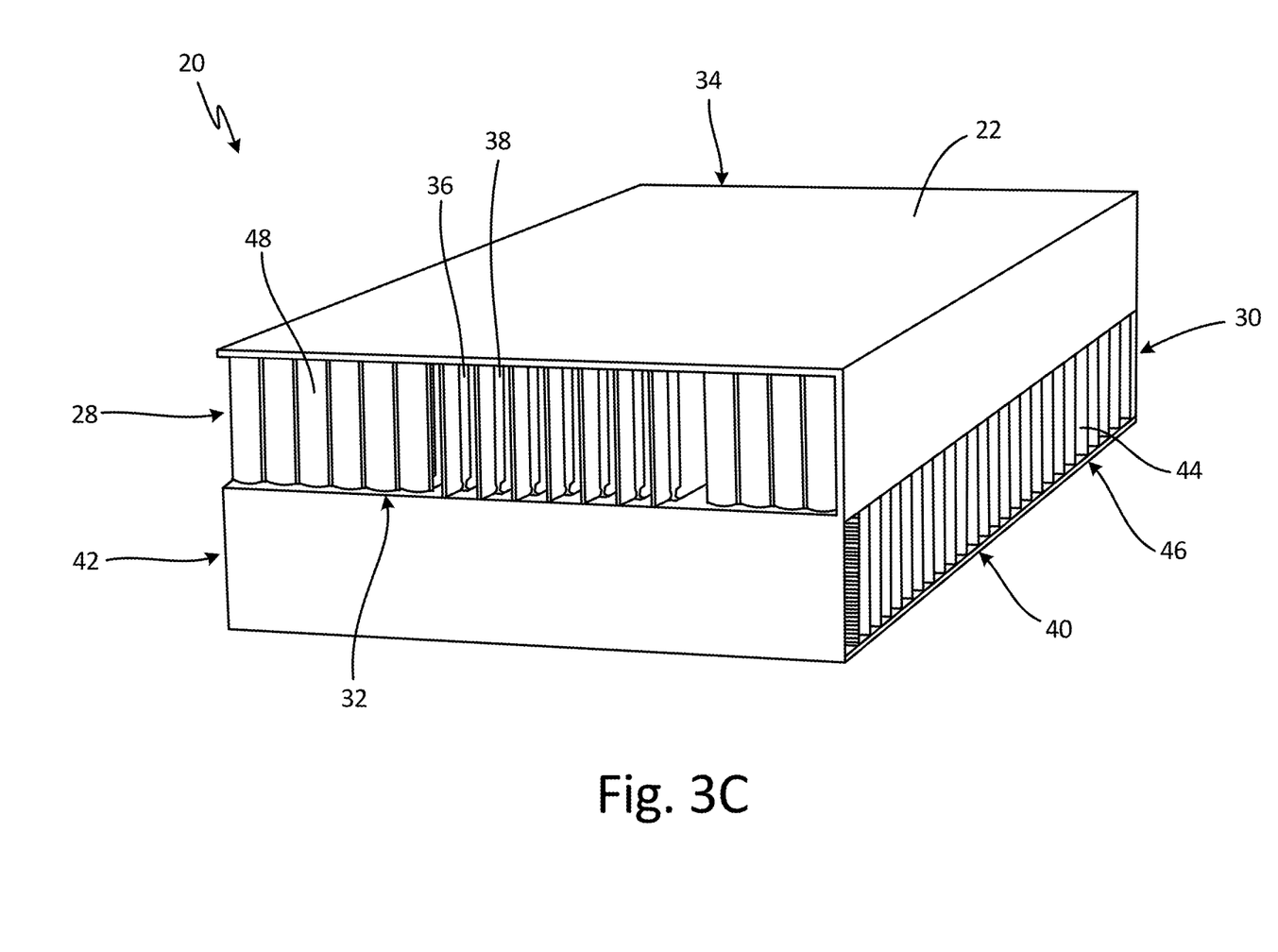
FIG. 3C is a perspective view of the first embodiment of the heat exchanger where some of the valves are open and some of the valves are closed.

FIG. 3A is a perspective view of heat exchanger 20 where valves 48 are closed. FIG. 3B is a perspective view of heat exchanger 20 where valves 48 are open. FIG. 3C is a perspective view of heat exchanger 20 where some of valves 48 are open and some of valves 48 are closed. Heat exchanger 20 includes housing 22, first flow path 28, second flow path 30, inlet 32, fins 36, passages 38, inlet 40, outlet 42, fins 44, passages 46, and valves 48.

Heat exchanger 20 includes housing 22 that forms a body of heat exchanger 20. First flow path 28 extends in a first direction through heat exchanger 20 and second flow path 30 extends in a second direction through heat exchanger 20 that is perpendicular to the first direction.

First flow path 28 has inlet 32 and outlet 34. A fluid enters first flow path 28 through inlet 32 and exits first flow path 28 through outlet 34. First flow path 28 further includes fins 32 that are walls that extend from inlet 32 to outlet 34. Fins 32 form passages 34 in first flow path 28. Passages 34 are open channels that extend from inlet 32 to outlet 34 through which the fluid in first flow path 28 flows.

Second flow path 30 has inlet 40 and outlet 42. A fluid enters second flow path 30 through inlet 40 and exits second flow path 30 through outlet 42. Second flow path 30 further includes fins 44 that are walls that extend from inlet 40 to outlet 42. Fins 44 form passages 46 in second flow path 30. Passages 46 are open channels that extend from inlet 40 to outlet 42 through which the fluid in second flow path 30 flows.

Valves 48 are positioned in front of first flow path 28. One valve 48 is positioned in front of each passage 38. As seen in FIG. 3A, all of valves 48 are in a closed position. As seen in FIG. 3B, all of valves 48 are in an open position. As seen in FIG. 3C, some of valves 48 are in an open position and some of valves 48 are in a close position.

Valves 48 can move between an open and closed position. Allowing each valve 48 to move between an open and closed position allows select passages 38 in first flow path 28 of heat exchanger 20 to be opened and closed. This allows heat exchanger 20 to be infinitely reconfigurable to provide different flow characteristics for different conditions. It allows passages 38 to be opened to cold fluid flow in areas where cold fluid flow is needed. Further, controlling the flow of cold fluid through first flow path 28 will control how much cooling is provided to the hot fluid flowing through second flow path 30. In this manner, the temperature of the hot fluid as it exits outlet 42 of second flow path 30 can be controlled.

Figure 4A:
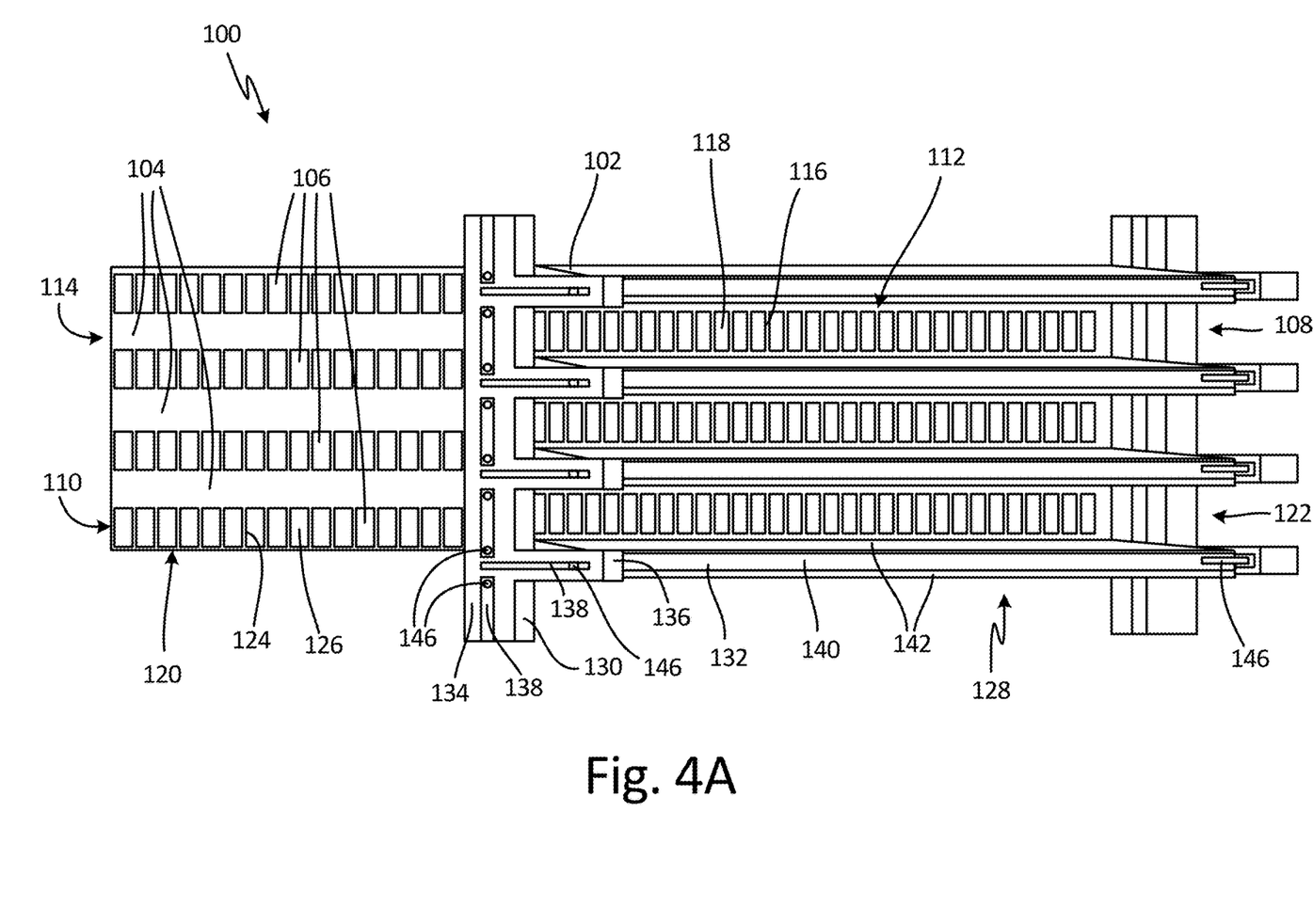
FIG. 4A is a perspective view of a second embodiment of a heat exchanger where valves are open.
Figure 4B:
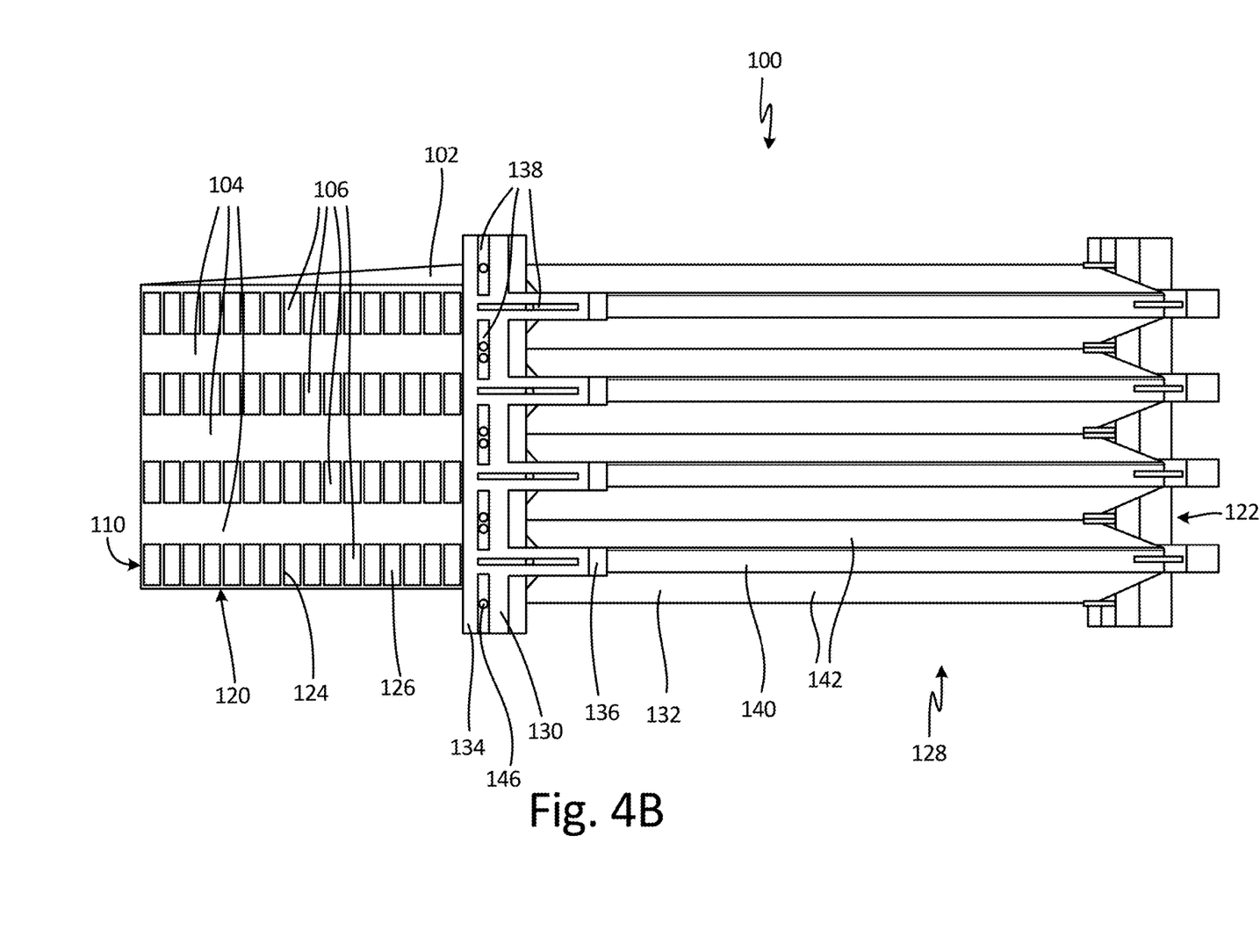
FIG. 4B is a perspective view of the second embodiment of the heat exchanger where valves are closed.
Figure 4C:
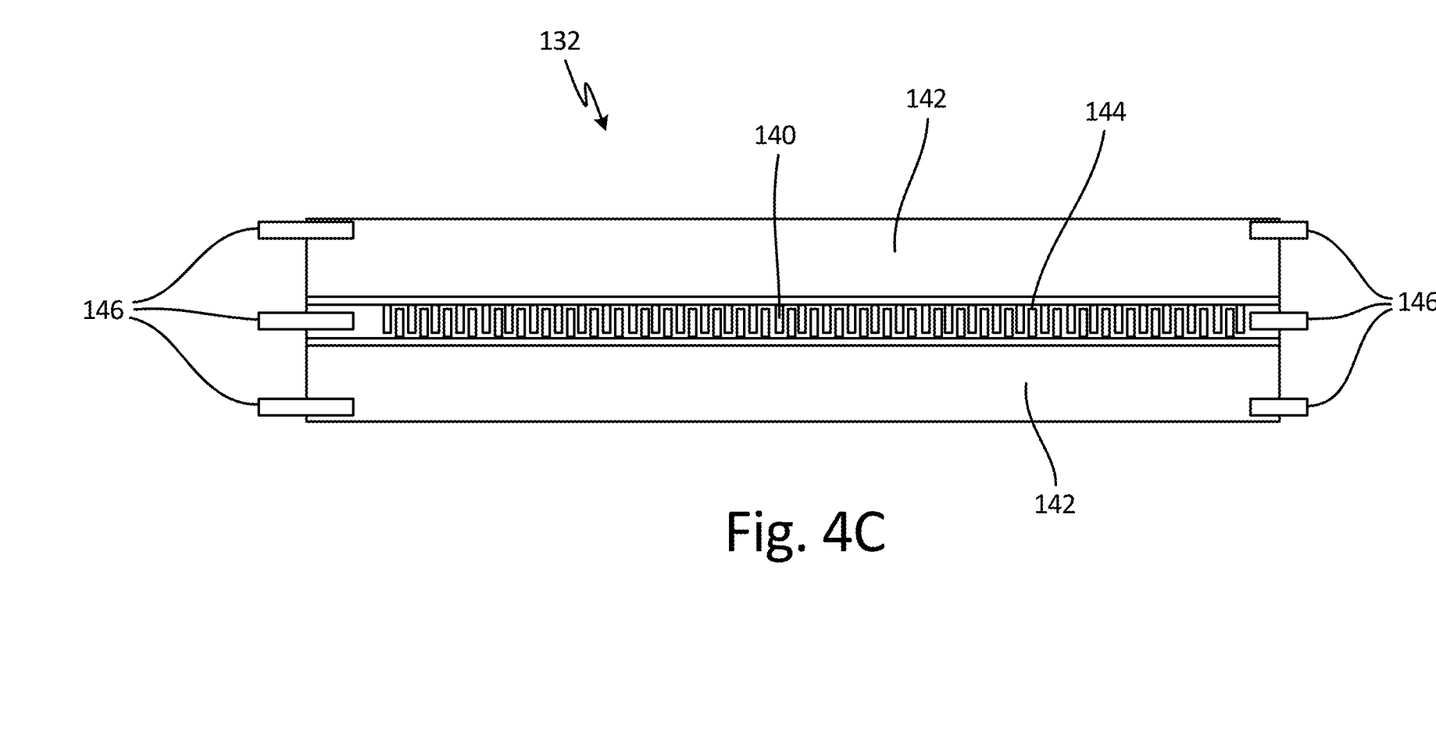
FIG. 4C is a front view of a valve for the second embodiment of the heat exchanger.

FIG. 4A is a perspective view of heat exchanger 100 where valves 132 are open. FIG. 4B is a perspective view of heat exchanger 100 where valves 132 are closed. FIG. 4C is a front view of valve 132 for heat exchanger 100. Heat exchanger 100 (shown in FIGS. 4A-4B) includes housing 102 (shown in FIGS. 4A-4B), plurality of first layers 104 (shown in FIGS. 4A-4B), plurality of second layers 106 (shown in FIGS. 4A-4B), first flow paths 108 (shown in FIG. 4A), second flow paths 110 (shown in FIGS. 4A-4B), inlets 112 (shown in FIG. 4A), outlets 114 (shown in FIG. 4A), fins 116 (shown in FIG. 4A), passages 118 (shown in FIG. 4A), inlets 120 (shown in FIGS. 4A-4B), outlets 122 (shown in FIGS. 4A-4B), fins 124 (shown in FIGS. 4A-4B), passages 126 (shown in FIGS. 4A-4B), valve assembly 128 (shown in FIGS. 4A-4B), valve support 130 (shown in FIGS. 4A-4B), valves 132, bases 134 (shown in FIGS. 4A-4B), arms 136 (shown in FIGS. 4A-4B), tracks 138 (shown in FIGS. 4A-4B), bases 140, flaps 142, heating elements 144 (shown in FIG. 4C), and pins 146.

Heat exchanger 100 includes housing 102 that forms a body of heat exchanger 100. Heat exchanger 100 includes plurality of first layers 104 and plurality of second layers 106. Heat exchanger 100 includes seven layers in the embodiment shown in FIGS. 4A-4B, including three first layers 104 and four second layers 106. In alternate embodiments, heat exchanger 100 can include any suitable number of layers. Plurality of first layers 104 include first flow paths 108 and plurality of second layers 106 include second flow paths 110. First flow path 108 extend in a first direction through heat exchanger 100 and second flow paths 110 extend in a second direction through heat exchanger 100 that is perpendicular to the first direction. In alternate embodiments, first flow paths 108 and second flow paths 110 can extend in parallel directions.

First flow paths 108 have inlets 112 and outlets 114. Inlets 112 are positioned on a first end of first flow paths 108 and outlets 114 is positioned on a second end of first flow paths 108. A fluid enters first flow paths 108 through inlets 112 and exits first flow paths 108 through outlets 104. First flow paths 108 further includes fins 116 that are walls that extend from inlets 112 to outlets 114. Fins 116 form passages 118 in first flow paths 108. Passages 118 are open channels that extend from inlets 112 to outlets 114 thru which the fluid in first flow paths 108 flows.

Second flow paths 110 have inlets 120 and outlets 122. Inlets 120 are positioned on a first end of second flow paths 110 and outlets 122 are positioned on a second end of second flow paths 110. A fluid enters second flow paths 110 through inlets 120 and exits second flow paths 110 through outlets 122. Second flow paths 110 further includes fins 124 that are walls that extend from inlets 120 to outlets 122. Fins 124 form passages 126 in second flow paths 110. Passages 126 are open channels that extend from inlets 120 to outlets 122 thru which the fluid in second flow paths 110 flows.

A cold fluid can flow through passages 118 of first flow paths 108 while a hot fluid flows through passages 126 of second flow paths 110. As the hot fluid flows through passages 126 of second flow paths 110 it will flows across fins 124 and heat will transfer out of the hot fluid and into fins 124. The heat from fins 124 in second flow paths 110 will then transfer through housing 102 of heat exchanger 100 and into fins 116 in first flow paths 108. The cold fluid flowing through passages 118 of first flow paths 108 can then absorb heat from fins 116. The cold fluid that has absorbed heat from fins 116 can then exit passages 118, removing the heat from heat exchanger 100. In this manner, the hot fluid flowing through second flow paths 110 will be cooled as it flows through heat exchanger 100 and the cold fluid flowing through the first flow paths 108 will be heated as it flows through heat exchanger 100.

Heat exchanger 100 further includes valve assembly 128 positioned in front of first flow paths 108 through heat exchanger 100. Valve assembly 128 includes valve support 130 and valves 132. Valve assembly 128 includes three valves 132 in the embodiment shown in FIGS. 4A-4B, but can include any number of valves 132 in alternate embodiments. One valve 132 is positioned in front of each first flow path 108. Each valve 132 can be moved between a closed and an open position independent of other valves 132. All of valves 132 can be opened at a time as seen in FIG. 4A, all of valves 132 can be closed at a time as seen in FIG. 4B, or select valves 132 can be opened and closed.

Valve support 130 includes two bases 134 positioned on either side of heat exchanger 100. Bases 134 each include arms 136 that extend outward from bases 134 away from heat exchanger 100. Tracks 138 extend through bases 134 and arms 136. Tracks 138 are open channels that provide paths along which valves 132 can move.

Valves 132 each include one base 140 and two flaps 142. A first flap 142 is attached to a first side of base 140 and a second flap 142 is attached to a second side of base 140. Flaps 142 are made out of a bimetallic alloy. Bimetallic alloys will change shape upon exposure to heat. Bimetallic alloys include two different metals that expand at different rates as they are heated. Examples of materials include steel and copper or steel and brass. As the bimetallic alloy is heated, the material with the higher coefficient of thermal expansion will expand faster and cause the bimetallic alloy to curve.

Heating elements 144 are positioned on bases 140 to heat bases 140 and flaps 142. Heating elements 144 can be manufactured or assembled onto flaps 142 using direct write additive manufacturing process or attached to flaps 142 using a high temperature adhesive bond. Heating elements 144 are connected to an controller (now shown in FIGS. 4A-4C) to provide electrical signals to heat elements 144 to cause heating elements 144 to generate heat. Heating elements 144 heat bases 140 which transfer heat to flaps 142 to cause flaps 142 to deform. Pins 146 are positioned on valves 132. Pins 146 are positioned on a first side and a second side of base 140 and on a first side and a second side of each of flaps 142 that form each valve 132. Pins 146 are positioned in tracks 138 in valve support 130. As heating element 144 is heated to cause flaps 142 to deform, pins 146 will slide along tracks 138 to move between an open and closed position.

Prior art valves were positioned in a duct that provided a cold fluid to first flow paths 108. This allowed the cold fluid flow to flow through all of plurality of first layers 104 or none of plurality of first layers 104. Further, if the valve were to fail, the cold fluid flow could not be controlled. Using one valve 132 positioned in front of each plurality of first layers 104 allows for greater control over the flow of cold fluid through first flow paths 108. Further, the impact of the failure of one valve 132 is greatly reduced and may not have a noticeable impact on the function of heat exchanger 100.

Valves 132 can move between open and closed positions. Allowing each valve 132 to move between an open position and closed position allows select first flow paths 108 in heat exchanger 100 to be opened and closed. This allows heat exchanger 100 to be infinitely reconfigurable to provide different flow characteristics for different conditions. It allows first flow paths 108 to be opened to cold fluid flow in areas where cold fluid flow is needed. Further, controlling the flow of cold fluid through first flow paths 108 will control how much cooling is provided to the hot fluid flowing through second flow paths 110. In this manner, the temperature of the hot fluid as it exits outlets 122 of second flow paths 110 can be controlled.

Discussion of Possible Embodiments

The following are non-exclusive descriptions of possible embodiments of the present invention.

A valve for a heat exchanger includes a base configured to be positioned adjacent to an inlet end of a heat exchanger, a heating element positioned on the base, and a flap connected to the base that is movable between an open position and a closed position. The open position permits the flow of fluid into the inlet end of the heat exchanger and the closed position blocks the flow of fluid into the inlet end. The flap is made from a heat responsive material.

The valve of the preceding paragraph can optionally include, additionally and/or alternatively, any one or more of the following features, configurations and/or additional components:

Wherein the material is a bimetallic alloy.

Wherein in the closed position, the flap is configured to prevent a fluid from flowing through a passage of the heat exchanger.

Wherein the flap is a first flap and further including a second flap connected to the base that is movable between an open position that permits the flow of fluid into the inlet end of the heat exchanger and a closed position that blocks the flow of fluid into the inlet end, wherein the second flap is made from a heat responsive material.

Wherein in the closed position, the first flap and the second flap are configured to prevent a fluid from flowing through a first flow path of the heat exchanger.

A heat exchanger includes a first flow path with an inlet and an outlet, a second flow path with an inlet and an outlet, and a valve positioned adjacent to the inlet of the first flow path. The valve includes a base, a heating element positioned on the base, and a flap connected to the base that is movable between an open position and a closed position. The open position permits the flow of fluid into the inlet end of the heat exchanger and the closed position blocks the flow of fluid into the inlet end. The flap is made from a heat responsive material.

The heat exchanger of the preceding paragraph can optionally include, additionally and/or alternatively, any one or more of the following features, configurations and/or additional components:

Wherein the material is a bimetallic alloy.

The heat exchanger further includes fins extending from the outlet to the inlet in the first flow path that form passages in the first flow path, and fins extending from the outlet to the inlet in the second flow path that form passages in the second flow path.

Wherein the valve is positioned adjacent to one passage at the inlet to the first flow path.

Wherein the base of the valve is connected to one fin in the first flow path.

Wherein in a closed position, the flap of the valve covers the passage at the inlet to the first flow path.

Wherein the valve is positioned adjacent to the first flow path.

Wherein flap of the valve is a first flap and wherein the valve further includes a second flap connected to the base that is movable between an open position and a closed position, wherein the flap is made from a material that is configured to move between the open position and the closed position when it is heated.

The heat exchanger a first valve support positioned on a first side of the heat exchanger, wherein the first valve support includes a base and an arm with tracks extending through the base and the arm; a second valve support positioned on a second side of the heat exchanger, wherein the second valve support includes a base and an arm with tracks extending through the base and the arm; first pins extending outwards from a first end of the base, the first flap, and the second flap; and second pins extending outwards from a second end of the base, the first flap, and the second flap. The first pins are positioned in the tracks in the first valve support and the second pins are positioned in the tracks in the second valve support, and the first pins and the second pins move along the tracks to guide the movement of the valve.

Wherein in a closed position, the valve covers the inlet to the first flow path.

A method of controlling the flow of fluid through a heat exchanger includes positioning a valve adjacent to an inlet of a first flow path of a heat exchanger. The valve includes a heat responsive flap that is movable between a first position and a second position. Heat is selectively applied to the heat responsive flap to move the flap from the first position to the second position. The application of heat to the heat responsive flap is discontinued to move the flap from the second position to the first position.

The method of the preceding paragraph can optionally include, additionally and/or alternatively, any one or more of the following features, configurations and/or additional components:

Wherein heat responsive flap is made out of a bimetallic alloy material.

Wherein selectively applying heat to the heat responsive flap to move the flap from the first position to the second position includes moving the flap from an open position to a closed position, and wherein discontinuing the application of heat to the heat responsive flap to move the flap from the second position to the first position includes moving the flap from the closed position to the open position.

The method further includes blocking the flow of fluid through a passage in a first flow path of the heat exchanger with the heat resistant flap.

The method further includes blocking the flow of fluid through a first flow path in the heat exchanger with the heat resistant flap.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve for a heat exchanger, the valve comprising:
    a base configured to be positioned adjacent to an inlet end of a heat exchanger;

a heating element positioned on the base; and
a flap connected to the base that is movable between an open position that permits the flow of fluid into the inlet end of the heat exchanger and a closed position that blocks the flow of fluid into the inlet end, wherein the flap is made from a heat responsive material, and wherein the heating element is configured to heat the flap to move the flap between the open position and the closed position.

2. The valve of claim 1, wherein the material is a bimetallic alloy.

3. The valve of claim 1, wherein in the closed position, the flap is configured to prevent a fluid from flowing through a passage of the heat exchanger.

4. The valve of claim 1, wherein the flap is a first flap and further comprising:
a second flap connected to the base that is movable between an open position that permits the flow of fluid into the inlet end of the heat exchanger and a closed position that blocks the flow of fluid into the inlet end, wherein the second flap is made from a heat responsive material.

5. The valve of claim 4, wherein in the closed position, the first flap and the second flap are configured to prevent a fluid from flowing through a first flow path of the heat exchanger.

6. A heat exchanger comprising:
a first flow path with an inlet and an outlet;
a second flow path with an inlet and an outlet; and
a valve positioned adjacent to the inlet of the first flow path, wherein the valve comprises:
a base;
a heating element positioned on the base; and
a flap connected to the base that is movable between an open position and a closed position, wherein the flap is made from a heat responsive material, and wherein the heating element is configured to heat the flap to move the flap between the open position and the closed position.

7. The heat exchanger of claim 6, wherein the material is a bimetallic alloy.

8. The heat exchanger of claim 6, and further comprising:
fins extending from the outlet to the inlet in the first flow path that form passages in the first flow path; and
fins extending from the outlet to the inlet in the second flow path that form passages in the second flow path.

9. The heat exchanger of claim 8, wherein the valve is positioned adjacent to one passage at the inlet to the first flow path.

10. The heat exchanger of claim 9, wherein the base of the valve is connected to one fin in the first flow path.

11. The heat exchanger of claim 10, wherein in a closed position, the flap of the valve covers the passage at the inlet to the first flow path.

12. The heat exchanger of claim 8, wherein the valve is positioned adjacent to the first flow path.

13. The heat exchanger of claim 12, wherein flap of the valve is a first flap and wherein the valve further comprises:
a second flap connected to the base that is movable between an open position and a closed position, wherein the flap is made from a material that is configured to move between the open position and the closed position when it is heated.

14. The heat exchanger of claim 13, and further comprising:
a first valve support positioned on a first side of the heat exchanger, wherein the first valve support includes a base and an arm with tracks extending through the base and the arm;
a second valve support positioned on a second side of the heat exchanger, wherein the second valve support includes a base and an arm with tracks extending through the base and the arm;
first pins extending outwards from a first end of the base, the first flap, and the second flap; and
second pins extending outwards from a second end of the base, the first flap, and the second flap;
wherein the first pins are positioned in the tracks in the first valve support and the second pins are positioned in the tracks in the second valve support; and
wherein the first pins and the second pins move along the tracks to guide the movement of the valve.

15. The heat exchanger of claim 13, wherein in a closed position, the valve covers the inlet to the first flow path.

16. A method of controlling the flow of fluid through a heat exchanger, the method comprising:
positioning a valve adjacent to an inlet of a first flow path of a heat exchanger, the valve including a heat responsive flap that is movable between a first position and a second position;
selectively applying heat to the heat responsive flap with a heating element positioned on a base connected to the heat responsive flap to move the flap from the first position to the second position; and
discontinuing the application of heat to the heat responsive flap to move the flap from the second position to the first position.

17. The method of claim 16, wherein heat responsive flap is made out of a bimetallic alloy material.

18. The method of claim 16, wherein selectively applying heat to the heat responsive flap to move the flap from the first position to the second position includes moving the flap from an open position to a closed position, and wherein discontinuing the application of heat to the heat responsive flap to move the flap from the second position to the first position includes moving the flap from the closed position to the open position.

19. The method of claim 16, and further comprising:
blocking the flow of fluid through a passage in a first flow path of the heat exchanger with the heat resistant flap.

20. The method of claim 16, and further comprising:
blocking the flow of fluid through a first flow path in the heat exchanger with the heat resistant flap.

21. A valve for a heat exchanger, the valve comprising:
a base configured to be positioned adjacent to an inlet end of a heat exchanger;
a heating element positioned on the base;
a first flap connected to the base that is movable between an open position that permits the flow of fluid into the inlet end of the heat exchanger and a closed position that blocks the flow of fluid into the inlet end, wherein the first flap is made from a heat responsive material; and
a second flap connected to the base that is movable between an open position that permits the flow of fluid into the inlet end of the heat exchanger and a closed position that blocks the flow of fluid into the inlet end, wherein the second flap is made from a heat responsive material.

22. The valve of claim 21, wherein in the closed position, the first flap and the second flap are configured to prevent a fluid from flowing through a first flow path of the heat exchanger.

23. A heat exchanger comprising:
   a first flow path with an inlet and an outlet;
   a second flow path with an inlet and an outlet;
   fins extending from the outlet to the inlet in the first flow path that form passages in the first flow path;
   fins extending from the outlet to the inlet in the second flow path that form passages in the second flow path; and
   a valve positioned adjacent to one passage at the inlet of the first flow path, wherein the valve comprises:
      a base, wherein the base of the valve is connected to one fin in the first flow path;
      a heating element positioned on the base; and
      a flap connected to the base that is movable between an open position and a closed position, wherein the flap is made from a heat responsive material.

24. The heat exchanger of claim 23, wherein in a closed position, the flap of the valve covers the passage at the inlet to the first flow path.

25. A heat exchanger comprising:
   a first flow path with an inlet and an outlet;
   a second flow path with an inlet and an outlet;
   fins extending from the outlet to the inlet in the first flow path that form passages in the first flow path;
   fins extending from the outlet to the inlet in the second flow path that form passages in the second flow path; and
   a valve positioned adjacent to the inlet of the first flow path, wherein the valve comprises:
      a base;
      a heating element positioned on the base; and
      a first flap connected to the base that is movable between an open position and a closed position, wherein the first flap is made from a heat responsive material;
      a second flap connected to the base that is movable between an open position and a closed position, wherein the second flap is made from a material that is configured to move between the open position and the closed position when it is heated.

26. The heat exchanger of claim 25, and further comprising:
   a first valve support positioned on a first side of the heat exchanger, wherein the first valve support includes a base and an arm with tracks extending through the base and the arm;
   a second valve support positioned on a second side of the heat exchanger, wherein the second valve support includes a base and an arm with tracks extending through the base and the arm;
   first pins extending outwards from a first end of the base, the first flap, and the second flap; and
   second pins extending outwards from a second end of the base, the first flap, and the second flap;
   wherein the first pins are positioned in the tracks in the first valve support and the second pins are positioned in the tracks in the second valve support; and
   wherein the first pins and the second pins move along the tracks to guide the movement of the valve.

27. The heat exchanger of claim 25, wherein in a closed position, the valve covers the inlet to the first flow path.

* * * * *